April 4, 1950          A. A. KOCH          2,502,730
MOWER
Filed Dec. 6, 1946          3 Sheets-Sheet 2
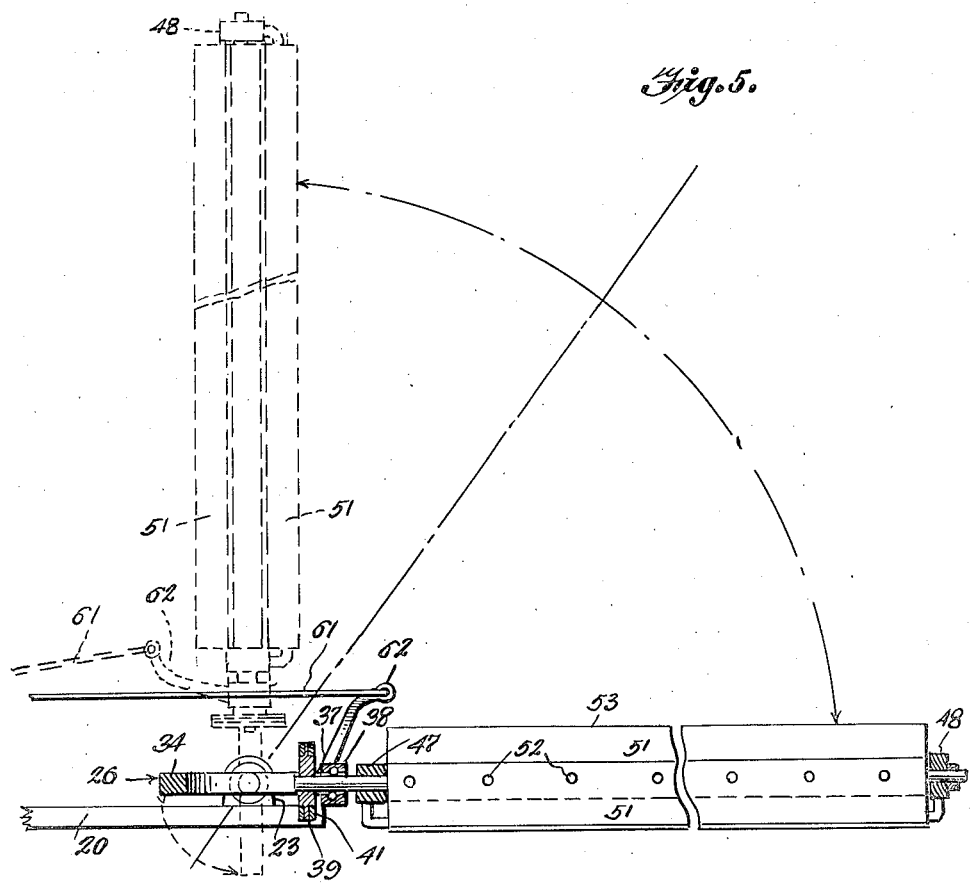
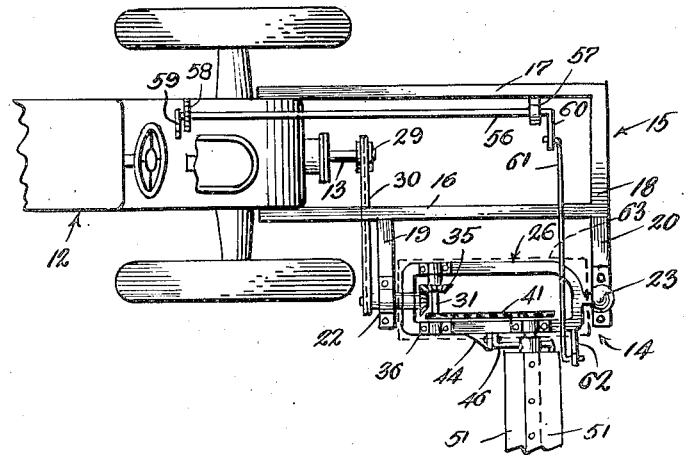
Inventor
ARTHUR A. KOCH
By Randolph & Beavers
Attorneys

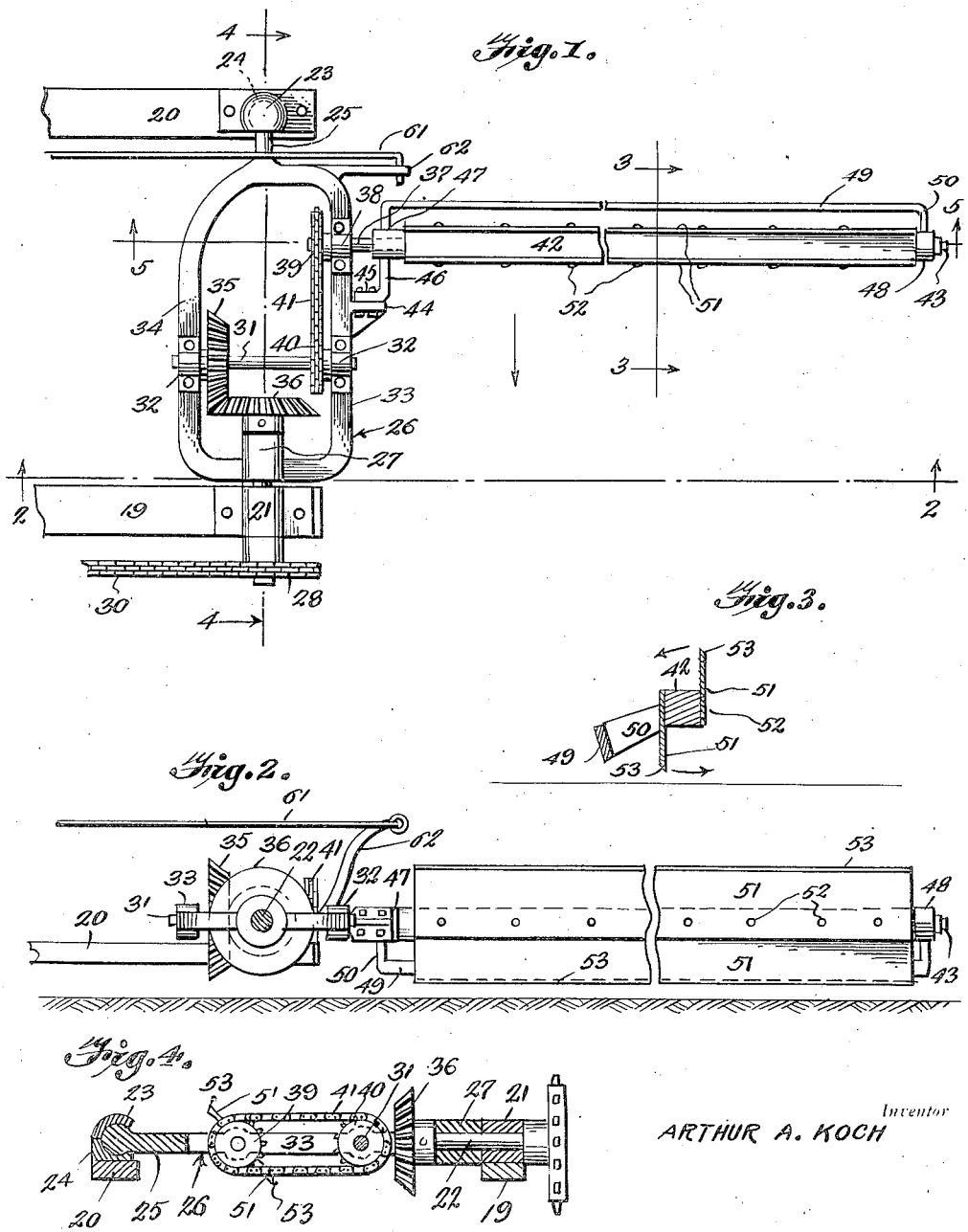

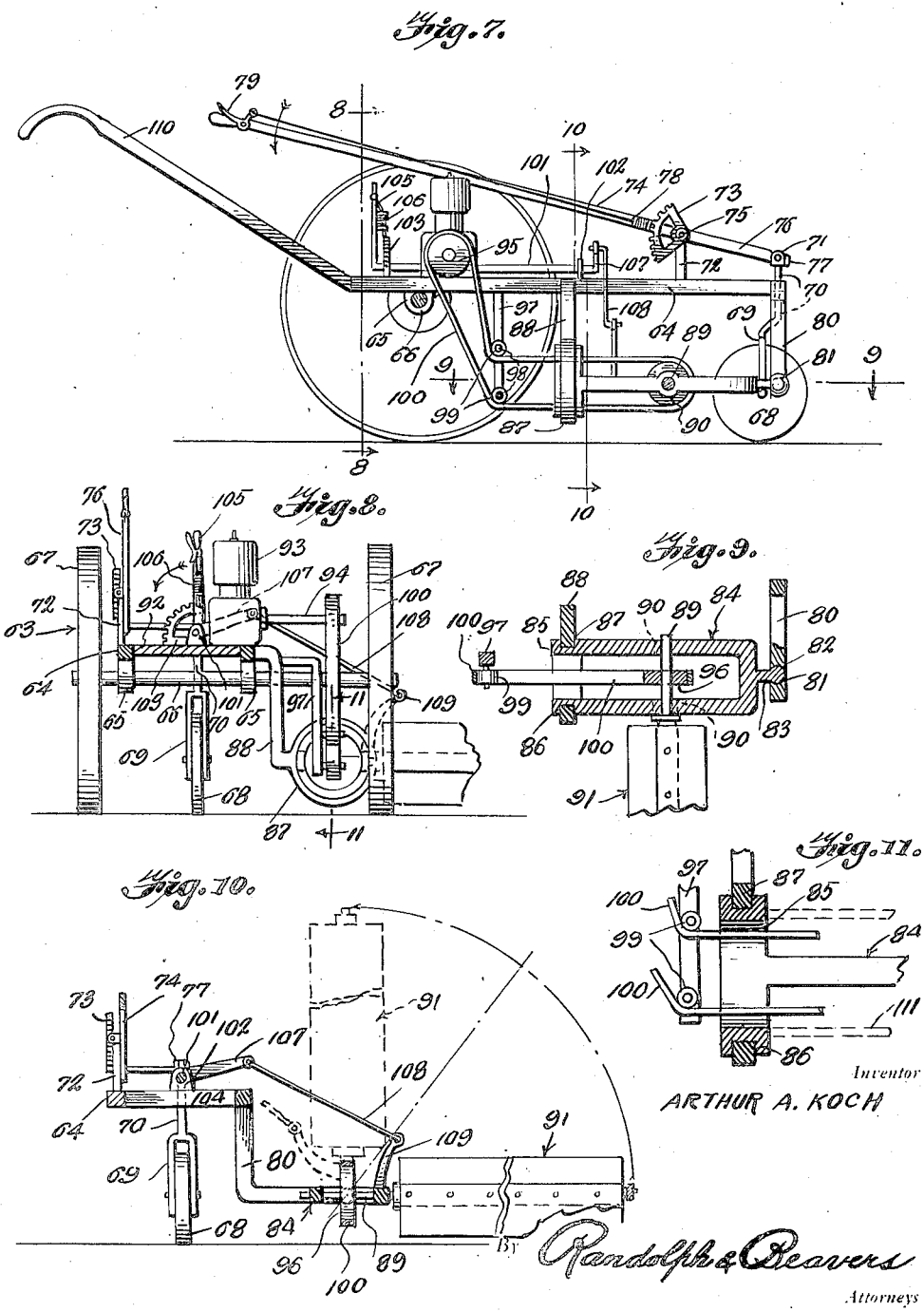

Patented Apr. 4, 1950

2,502,730

UNITED STATES PATENT OFFICE 2,502,730

MOWER

Arthur A. Koch, Dexter, Iowa

Application December 6, 1946, Serial No. 714,560

10 Claims. (Cl. 56—26)

This invention relates to a novel construction of driven mower especially adapted for use in cutting grass, grain, weeds and brush at various levels and which is so constructed that the cutting means of the mower may operate at any angle between a horizontal and perpendicular position with respect to the horizontal plane of the machine.

More particularly, it is an object of the invention to provide an improved construction of mower capable of use either as an attachment for a tractor and which is adapted to be driven from the power take-off means thereof or which may be embodied in a hand-propelled machine having driving means for actuating the cutter of the mower.

Still a further aim of the invention is to provide a mower which will function efficiently for cutting growth at an incline with respect to the supporting surface of the machine, such as along the edge of a slope, along a mound or which may be utilized for trimming brush along roadways for removing the overhanging portion of the brush and which is also capable of being used for trimming hedges or bushes at various angles with respect to the horizontal.

Numerous other objects and advantages of the invention will hereinafter become more fully apparent from the following description of the drawings, illustrating preferred embodiments thereof, and wherein:

Figure 1 is a fragmentary plan view of one embodiment of the mower and which is adapted for use as an attachment for a tractor;

Figure 2 is a transverse sectional view taken substantially along a plane as indicated by the line 2—2 of Figure 1;

Figure 3 is a cross sectional view of the cutting means of the mower taken substantially along a plane as indicated by the line 3—3 of Figure 1;

Figure 4 is a longitudinal sectional view taken substantially along a plane as indicated by the line 4—4 of Figure 1;

Figure 5 is a transverse sectional view taken substantially along a plane as indicated by the line 5—5 of Figure 1;

Figure 6 is a fragmentary plan view, on a reduced scale, showing the mower of Figures 1 to 5 applied to the rear end of a conventional tractor and with the cutting means thereof operatively connected to the power take-off shaft of the tractor;

Figure 7 is a side elevational view, partly in longitudinal section illustrating another embodiment of the invention;

Figure 8 is a cross sectional view taken substantially along a plane as indicated by the line 8—8 of Figure 7;

Figure 9 is a fragmentary horizontal sectional view taken substantially along a plane as indicated by the line 9—9 of Figure 7;

Figure 10 is a cross sectional view taken substantially along a plane as indicated by the line 10—10 of Figure 7; and Figure 11 is a fragmentary longitudinal vertical sectional view taken substantially along a plane as indicated by the line 11—11 of Figure 8.

Referring more specifically to the drawings and first with reference to Figures 1 to 6, inclusive, a rear portion of a tractor, designated generally 12, is illustrated in Figure 6 and is shown provided with a rearwardly extending power take-off shaft 13.

The embodiment of the invention as illustrated in Figures 1 to 6 comprises a mower attachment, designated generally 14 and which includes a frame, designated generally 15 having longitudinal beams 16 and 17 which are connected at their rear ends by a cross beam 18. The forward ends of the beams 16 and 17 are adapted to straddle the rear end of the frame or chassis of the tractor 12 and are detachably secured thereto in any suitable manner, for detachably supporting the frame 15 in substantially a horizontal position and behind the tractor 12. The beam 16 is provided with longitudinally spaced laterally and outwardly extending supporting arms 19 and 20. The supporting arm 19 is disposed intermediate of the ends of the beam 16 and rearwardly of the rear wheels of the tractor 12 and the arm 20 is disposed substantially in alignment with the cross bar 18.

As best seen in Figure 4, the free end of the arm 19 is provided with a bearing 21 which is formed of detachable sections and in which a shaft 22 is journalled. The free end of the arm 20 is provided with a socket type bearing 23, likewise formed of detachable sections and in which a substantially spherical member 24 is turnably mounted. The member 24 is fastened to the free end of an arm 25 which extends from one end of an oblong open frame 26, as best seen in Figure 1, which is disposed longitudinally between the arms 19 and 20. The opposite end portion of the frame 26 is provided with a bearing or sleeve portion 27 in which a portion of the shaft 22 is journalled and by means of which said end of the frame 26 is rotatably supported relatively to the arm 19.

The forward end of the shaft 22, forwardly of the bearing 21, has a sprocket wheel 28 keyed thereto and disposed substantially in transverse alignment with a sprocket wheel 29, keyed to the rear end of the power take-off shaft 13. An endless chain 30 is trained over the sprocket wheels 28 and 29 for driving the shaft 22 from the power take-off shaft 13. It will be readily apparent, that belt pulleys could be substituted for the sprocket wheels 28 and 29 and that a belt be substituted for the chain 30 or other means for forming a driving connection such as a shaft and bevelled gears could be utilized.

A shaft 31 is journalled transversely in the frame 26 in bearings 32 formed in the sides 33 and 34 of the frame 26. A bevelled gear 35 is keyed to the shaft 31 and meshes with a bevelled gear 36 which is keyed to the rear end of the shaft 22 and disposed likewise within the frame 26. A shaft 37 is journalled adjacent one end thereof in a bearing 38 in the side 33, rearwardly of the bearings 32. The inner end of the shaft 37 has a sprocket wheel 39 keyed thereto and disposed within the frame 26 and substantially in alignment with a sprocket wheel 40 which is keyed to the shaft 31. An endless chain 41 is trained over the sprocket wheels 39 and 40 for driving the shaft 37 from the shaft 31.

An elongated bar 42, which is substantially square in cross section, is fixed at one end thereof to the opposite, outer end of the shaft 37 and outwardly of the side 33 of the frame 26 and said bar 42 extends laterally and outwardly from the frame 26 and has a sub-shaft 43 fixed to and projecting from its outer end. If desired, the shafts 37 and 34 may be formed integral with the bar 42. A bracket 44 extends outwardly from the side 33 and is detachably fastened to an angular end 45 of an arm 46 which extends substantially parallel to the side 33 and which supports a bearing 47 in which the shaft 37 is journaled, outwardly of the bearing 38. The stub shaft 43 is journaled in a bearing 48 which is connected to the bearing 47 by a bar 49, as seen in Figures 1, 2 and 3 having inturned ends 50 which are suitably secured to or formed integral with the bearings 47 and 48.

A pair of blades 51 are detachably secured by screws or other fastenings 52 to opposite sides of the bar 42, adjacent the rear edges thereof, said blades 51 projecting in opposite directions from the bar 42 and having outer sharpened cutting edges 53. The blades 51 extend substantially the length of the supporting bar 42 and the cutting edges thereof are preferably co-extensive with the length of the blades. Said blades 51 may be formed integral or may be composed of a plurality of sections connected to the bar 42 in end to end relationship. As best seen in Figure 3, the bar 49 is disposed outwardly of the path or travel of the cutting edges 53 and above and behind the lowermost point of said travel. The bar 42 and blades 51 are revolved in a counter-clockwise direction, as seen in Figure 3, and at a very rapid rate, for cutting weeds, grain, grass, brush or other growth, substantially at the level of the lowermost point of the travel of said cutting edges 53.

As best seen in Figure 6, a shaft 56 is journaled adjacent one end thereof in a bearing 57, supported by the beam 17 and is journaled adjacent its opposite end on a latched plate 58, which forms a part of the mower attachment 14 but which is detachably mounted on the tractor 12. The forward end of the shaft 56 is provided with a crank handle or lever 59, disposed adjacent the latch plate 58 and by means of which the shaft 56 may be rotated and latched, by engagement with the plate 58, in any desired position. The opposite end of the shaft 56, rearwardly of the bearings 57, is provided with a laterally projecting crank 60 which is pivotally connected to one end of a rigid link 61. As best seen in Figures 1 and 2, an arm 62 extends upwardly and outwardly from the side 33 of the frame 26, adjacent its rear end and the opposite end of the rigid link 61 is pivotally connected to the free end of the arm 62 so that when the shaft 56 and its crank 60 is swung in one direction, a counter-clockwise direction looking from front to rear of the attachment, the frame 26 will be revolved in a counter-clockwise direction, as seen in Figure 5, to swing the cutting mechanism from its full line, substantially horizontal position, upwardly and inwardly. It will thus be readily apparent that the cutting mechanism can be adjusted from any position between its full line, horizontal position and its dotted line, perpendicular position of Figure 5, for cutting brush, weeds and the like along a slope and at an angle to the surface over which the tractor 12 is moving. Likewise, the mower attachment may be utilized for cutting a substantially flat and horizontal surface when disposed in its full line position of Figure 5 or may be utilized for trimming the sides of hedges or bushes when in its upright, dotted line position of Figure 5. It will be readily obvious that the blades 51 and blade support 42 may be revolved in a counter-clockwise direction, as seen in Figure 3, through the driving connection, previously described, when the power take-off shaft 13 is rotated in a clockwise direction, looking from front to rear of the tractor. The frame 26 and the parts disposed therein are preferably enclosed in a removable liquid type housing 63, as seen in dotted lines in Figure 6, which is adapted to contain oil or grease for lubricating the part.

The manually propelled embodiment of the invention, as illustrated in Figures 7 to 11, inclusive, includes a manually propelled machine, designated generally 63, having a supporting frame 64 which is provided adjacent the rear end thereof with depending, transversely aligned bearings 65 for journaling a transversely disposed axle 66 on the ends of which ground engaging wheels 67 are mounted. A single front caster wheel 68 is journaled in a fork 69 having an upwardly extending forwardly offset stem or shank 70 which is reciprocally mounted in the front cross-piece of the frame 64 and which is provided at its upper end with a bifurcated yoke 71 which is swivelly connected thereto. A standard 72 rises from one side of the frame 64 and has a latch segment 73 fixed thereto and extending rearwardly therefrom. A relatively long lever 74 is pivotally connected at 75, adjacent its forward end, on the standard 73 at the apex of the latch segment 73 and is provided, forwardly thereof, with a laterally offset forward terminal portion 76, which is offset toward the center of the frame 64 and which is pivotally connected by a pin 77 in the yoke 71. The lever 74 carries latch means 78 which is spring biased into engagement with the teeth of the segment 73 and which is actuated by an operating lever 79 which is pivotally mounted adjacent the rear end of the lever 74, which is disposed rearwardly of the frame 64, as seen in Figure 7.

As best seen in Figure 10, a hanger 80 depends from the forward end of the frame 64, at the side thereof opposite to the standard 72 and is provided with an outwardly extending lower portion which terminates in a socket type bearing 81 for receiving a substantially spherical member 82 which is turnably disposed therein and which is connected to an arm 83, as seen in Figure 9. The arm 83 extends outwardly from the intermediate portion of a substantially U-shaped frame 84 having substantially parallel legs which extend rearwardly from the forward, intermediate portion thereof. The frame 84, at its opposite, rear end, is provided with a ring portion 85 which is formed integral with the rear ends of the legs thereof and which is disposed with its plane substantially vertical at a right angle to the longitudinal axes of the frame legs. As seen in Figure 11, a ring portion 85 is provided with an external annular groove 86 for receiving a ring 87 which is turnably disposed therein and which forms an outward extension of the lower end of a hanger 88 which depends from the same side of the frame 64 as the hanger 80 and which is disposed rearwardly thereof.

A shaft 89 is journaled transversely of the frame 84 in bearings 90 formed in the parallel legs thereof and said shaft 89 extends laterally in a direction outwardly from the frame 84 and carries rotary cutter means, designated generally 91, and corresponding to the cutter means of the attachment 14, including the parts 42, 51 and 52. As the manually propelled machine is of lighter construction, the bearings 47 and 48 and the supporting bar 49 may be dispensed with.

A platform 92 is mounted in a portion of the frame 64 and supports a motor 93 which is fastened thereon, forwardly of the axle 66 but adjacent thereto. The motor 93 has a driven shaft 94 extending laterally from the frame 64 in the same direction as the cutter means 91 and which is provided with a belt pulley 95, keyed thereto and disposed substantially in longitudinal alignment with a belt pulley 96, keyed to the shaft 89 and within the frame 84. An outwardly offset depending hanger 97 is supported by the frame 64 at the same side of and behind the hanger 88 and is provided with vertically spaced outwardly projecting stub-shafts 98 on which idler belt pulleys 99 are journalled. An endless belt 100 is trained over the belt pulleys 95 and 96 and extend through the ring 85, as seen in Figure 11, and has its upper flight trained under and guided by the upper pulley 99 and its lower flight trained under and guided by the lower pulley 99, as seen in Figures 7 and 11. It will thus be readily apparent that when the motor or engine 93 is in operation for rotating its shaft 94 in a counter-clockwise direction as seen in Figure 7, that the shaft 89 will be driven in the same direction for revolving the cutting means 91, likewise, in the same direction, for cutting grass, weeds, brush and the like as the mower 63 is manually propelled, as will hereinafter be described, in a direction from left to right as seen in Figure 7.

A shaft 101 is disposed above and journalled relatively to the frame 64 by means of a bearing 102, adjacent its forward end and by means of a latch segment 103 at its rear end. The bearing 102 is mounted on a cross-brace 104 of the frame 64 and the latch segment 103 is fixedly supported on the platform 92 and the shaft 101 is journalled in the apex thereof, as best seen in Figure 8. The shaft 101, at its rear end, is provided with an upturned lever portion 105 having manually actuated latch means 106 for co- operation with the latch segment 103 to retain the shaft 101 in any position to which it is moved by the lever 105. The opposite end of the shaft 101, forwardly of the bearing 102, is provided with a crank 107, the free end of which is pivotally connected to one end of a rigid link 108. As best seen in Figure 10, an arm 109 extends upwardly and outwardly from the outer leg of the frame 84 and is pivotally connected at its free end to the opposite end of the link 108 whereby the lever 105 may be actuated for moving the cutting mechanism 91 from a horizontal to a vertical position, as seen in Figure 10, or for releasably latching said mechanism 91 at any angle between the horizontal and vertical and in any of which positions the cutting mechanism 91 may be revolved by rotation of the shaft 94 for executing its normal cutting operation. The belt 100 may be provided with sufficient play to accommodate the rocking movement of the belt pulley 96 which occurs during the angular adjustment of the cutting mechanism 91.

The frame 64 is provided with upwardly and rearwardly extending, laterally spaced handle members 110 at the rear end thereof and which are adapted to be manually engaged by the operator of the mower 63 for manually propelling the mower in a direction left to right of Figure 7. It will be readily obvious that the rear handle end of the lever 74 is conveniently situated relatively to the handle 110 so that the latch means 78 thereof may be released and the lever 74 adjusted for raising and lowering the front wheel 68 to vary the cutting level of the cutting means 91, when in its normal, horizontal position. Likewise, the lever 105 and latch mechanism 106 thereof is also conveniently located relatively to the handles 110 so that the operator while in a position to propel the mower 63 may adjust the elevation or angle of the cutting mechanism 91 without moving from his position between the handles 110. The caster wheel 68 will enable the vehicle 63 to be readily steered as it is manually propelled. The frame 84, like the frame 26, is adapted to be enclosed in a detachable housing, seen in dotted lines at 111 in Figure 11.

Various modifications and changes are contemplated and may obviously be resorted to, without departing from the spirit and scope of the invention as hereinafter defined by the appended claims.

I claim:

1. In a driven mower, a pair of spaced supporting members, an elongated open frame disposed longitudinally between and journaled relatively to said supporting members, a shaft journaled in said frame and having an end extending laterally therefrom in a direction outwardly of the frame, a blade support carried by said end of the shaft, a plurality of blades mounted on the blade support and projecting therefrom in opposite directions and having outer cutting edges, and driving means for rotating said shaft.

2. A mower as in claim 1, said frame being journaled between said supporting members for rotation about its longitudinal axis, and means for rotating the frame and for adjustably supporting it and the rotary blades at various angles relatively to said supporting members.

3. A mower as in claim 1, a supporting bar detachably supported on the frame and having laterally offset bearings at the ends thereof, said shaft being journaled in one of said bearings, and a stub shaft projecting from the outer end of the cutter blade support and journaled in the other of said bearings, said supporting bar being disposed behind the cutting blades.

4. A mower as in claim 1, a supporting frame on which said supporting members are mounted, said frame being detachably mounted on a tractor, and power take-off means for driving said shaft from the power take-off shaft of the tractor.

5. In a driven mower, a pair of spaced supporting members, an elongated open frame disposed longitudinally between and journaled relatively to said supporting members, a shaft journaled in said frame and extending laterally therefrom in a direction outwardly of the frame, a blade support carried by said shaft, a plurality of blades mounted on the blade support and projecting therefrom in opposite directions and having outer cutting edges, means for rocking the elongated open frame for raising and lowering the blades on said frame as a pivot, driving means for rotating said shaft, a manually propelled wheeled vehicle on which said supporting members are mounted, and a prime mover supported by the wheeled vehicle and connected to said shaft for revolving the shaft and the rotary cutting blades connected thereto.

6. A mower as in claim 5, and manually actuated means for raising and lowering one of the wheels of the vehicle relatively to the vehicle frame for varying the level of the cutting means, said manually actuated means being operable from a position, adjacent to the position at which the machine is engaged for propelling the same.

7. In a mower attachment for tractors, a frame adapted to be detachably mounted at one end of a tractor and longitudinally thereof, supporting arms projecting laterally from said frame, a bearing frame supported longitudinally between said supporting arms and journaled therein for rotation about its longitudinal axis, pivot rotary cutting means journaled in said frame and projecting outwardly therefrom, power take-off means adapted to be connected to the power take-off shaft of the tractor and to the rotary cutting means for driving the latter, and manually actuated means for rotating the bearing frame relatively to said arms and for adjustably retaining the bearing frame therein, for positioning the rotary cutting means at various angles relatively to the plane of said attachment.

8. An attachment as in claim 7, said power take-off means including shafts journalled in said bearing frame, bevelled gears connecting said shafts, one of said shafts being operatively connected to the power take-off shaft of the tractor, and the other of said shafts being operatively connected to the rotary cutter.

9. A driven rotary-type cutter comprising a mobile body, an elongated open frame disposed longitudinally of the body, means for supporting and journaling end portions of the frame in the body for mounting the frame for rotating movement on its longitudinal axis, a shaft having one end journaled in the frame and transversely thereof, a revolving cutter supported on the opposite end of the shaft and outwardly of the frame, and driving means for said shaft including a portion disposed in the frame for rotary movement therewith relatively to the body.

10. A driven rotary-type cutter as in claim 9, said frame being disposed to revolve in the body on substantially a horizontal axis for swingably supporting the cutter relatively to the body for swinging movement in a vertical plane on said horizontal axis.

ARTHUR A. KOCH.

REFERENCES CITED

The following references are of record in the file of this patent:

UNITED STATES PATENTS

| Number | Name | Date |
|---|---|---|
| 1,237,832 | Smith | Aug. 21, 1917 |
| 1,394,351 | Pribnow | Oct. 18, 1921 |
| 1,459,998 | Simmons | June 26, 1923 |
| 1,656,517 | Goulet | Jan. 17, 1928 |